United States Patent

[11] 3,617,595

[72] Inventor Joseph Aloysius Mulcahy
 Brooklin, Ontario, Canada
[21] Appl. No. 73,094
[22] Filed Sept. 17, 1970
[45] Patented Nov. 2, 1971
[73] Assignee Lake Ontario Steel Company Limited
 Whilly, Ontario, Canada

[54] ELECTRIC FURNACE CONTROL
 11 Claims, 1 Drawing Fig.
[52] U.S. Cl. .................................................... 13/13
[51] Int. Cl. .................................................... F27d 11/10
[50] Field of Search .......................................... 13/13

[56] References Cited
UNITED STATES PATENTS
3,255,291   6/1966   Weisgerber .................. 13/13
3,414,657   12/1968  Beck ........................... 13/13

Primary Examiner—Bernard A. Gilheany
Assistant Examiner—R. N. Envall, Jr.
Attorney—Westell & Hanley ABSTRACT: A method and apparatus for regulating the arc of an electrode in an electric arc melting furnace, in which the voltage drop across the bus bar feeding the electrode is transformed into a comparator signal which is used to regulate the vertical position of the electrode in the furnace to bring the comparator signal to a predetermined value.

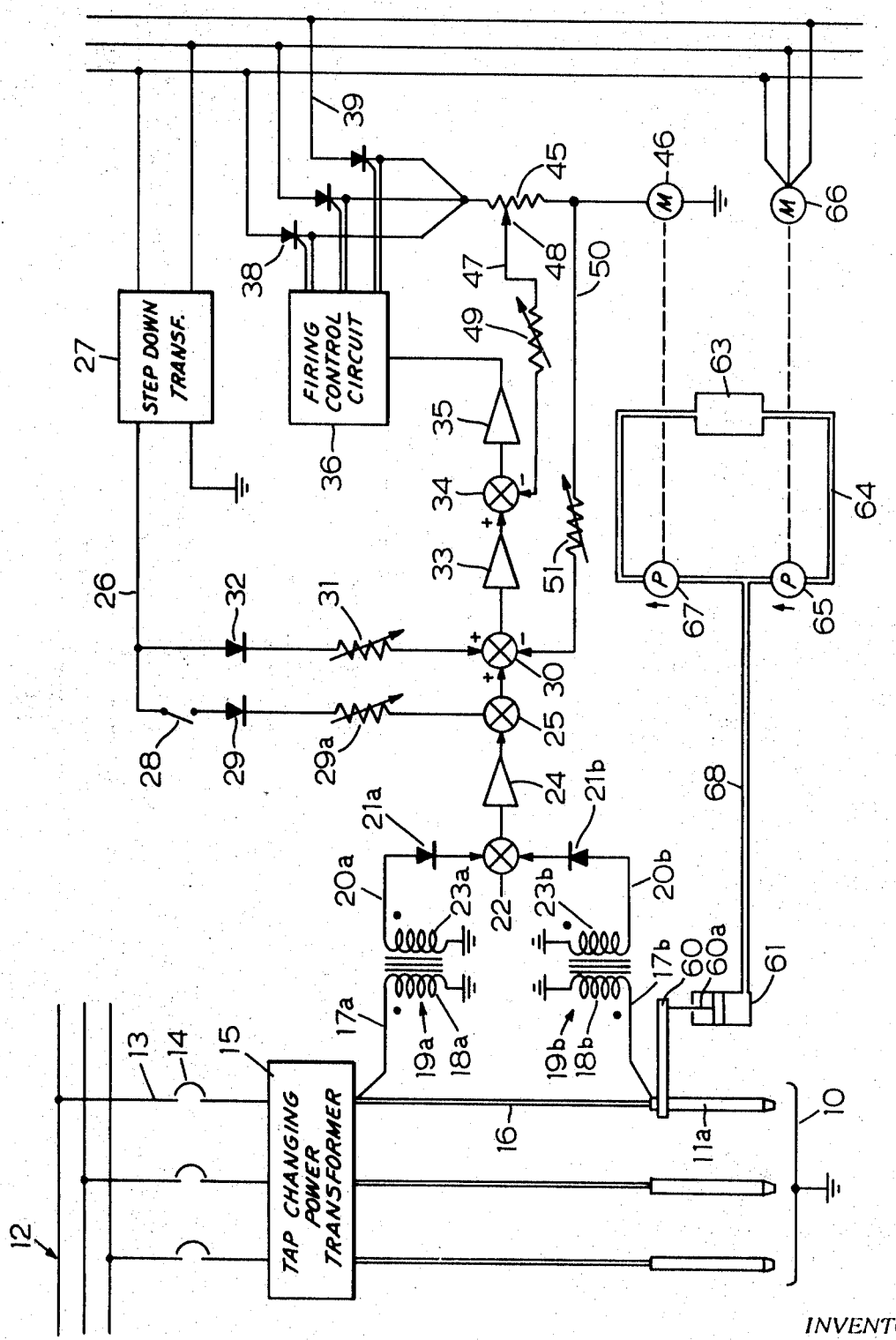

ELECTRIC FURNACE CONTROL

The present invention relates to the operation of an electric arc furnace and more particularly to the control and regulation of the arcing of the electrodes in such a furnace. In an alternating current electric arc furnace the power factor for any given arc voltage is known as the refractory index and there is an optimum power factor, for a given arc voltage, which gives a minimum refractory wear. The power factor is altered if the electrode arc is lengthened or shortened or if the electrode circuit is opened or grounded, and this happens as the physical characteristics of the melt changes. Consequently any variation in the electrode arc increases refractory wear and, if prolonged, may cause breakage of the electrode which changes the metallurgical characteristics of the melt. If it is possible to maintain a constant power factor during transient conditions, this will prevent the inducement of a poor refractory index and electrode breakage.

The operating efficiency of an electric open arc furnace may be increased by increasing the power supply to the furnace. Increasing the power supply allows superheating which in turn allows pellets to be charged into the furnace at an earlier stage in the melt. Also, the highest thermal efficiency is obtained with maximum power. However, as the electrical power input to the furnace increases it becomes increasingly difficult to maintain a substantially constant power factor. Since it is expensive in labor and shutdown time to replace damaged refractory linings, and electrode breakage contaminates the melt, the upper limit of power input into the electric furnace is maintained at a level below that available from power sources in order to control the power factor.

It is an object of the present invention to regulate the arc of an electrode in an electric open arc furnace by controlling the position of the electrode whereby a higher power input is achieved without an undue increase in refractory wear. This is accomplished by providing a rapid reaction to arc changes and the reestablishment of a proper arc length.

An example embodiment of the invention is shown in the accompanying drawing which is a schematic circuit diagram of an electrode arc regulator.

The drawings show schematically an electric furnace 10 employing three electrodes 11 which receive power from a three-phase alternating power source through a line 12. Lines 13 draw power from line 12, each through a circuit breaker 14 to a transformer 15 which has a number of taps (not shown) to vary the power input to electrodes 11 as required. Bus bars 16 connect the secondary winding of transformer 15 to each electrode 11.

For purposes of simplicity, the control apparatus for regulating one electrode 11a is shown in the drawings; each electrode is controlled by a separate apparatus of the same nature. As seen in the drawing, a first line 17a leading from the connection of the output of transformer 15 to bus bar 16 of electrode 11a is connected with the primary winding 18a of a transformer 19a and thence to ground. A second line 17b leads from bus bar 16 at the connection to electrode 11a and is connected with the primary winding 18b of a second transformer 19b which is also connected to ground. One end of secondary winding 23a of transformer 19a is grounded and the other end is connected by a line 20a with a diode 21a to one input of an adder 22. Similarly one end of secondary winding 23b of transformer 19b is grounded and the other end is connected by a line 20b with a diode 21b to another input of adder 22. Lines 20 are connected with the secondary windings 23 of transformers 19 in a manner to transmit voltages of opposite polarity to adder 22.

The output of adder 22 is connected to the input of an amplifier 24 and the amplifier is connected at its output to one input of an adder 25. A line 26 leading from the high-tension output terminal of a stepdown transformer 27, powered from a three-phase line, is connected in series with a normally open switch 28, a diode 29 and a rheostat 29a to another input of adder 25. The output of adder 25 is connected to one input of an adder 30 having another input connected in series with rheostat 31 and a diode 32 to line 26. The output of adder 30 is connected to the input of an amplifier 33 having its output connected to one input of an adder 34. The output of adder 34 is connected to the input of an amplifier 35 which has its output connected to the input terminal of a three-phase firing control circuit 36 having three pairs of output terminals, each pair being connected to apply a signal between the gate and the cathode of a silicon-controlled rectifier 38 having its anodes respectively connected to the different lines 39 of a three-phase input. A firing control circuit 36 suitable for the purpose is manufactured and sold by Sprague Electric Company, North Adams, Massachusetts, U.S.A., under the trademark PHASETROL. The cathodes of silicon-controlled rectifiers 38 are connected together and to one end of a resistor 45 having its other end connected to one terminal of a direct current motor 46, the other terminal of the motor being grounded. A line 47 connects an adjustable sliding contact 48 on resistor 45 through a variable resistor 49 to the input of adder 34 which is designed to provide an output signal proportional to the difference between the two inputs to the adder. A line 50 is connected to the connection between resistor 45 and motor 46 through a variable resistor 51 to a third input of adder 30 which is designed to provide an output signal proportional to the difference of: the sum of the first and second inputs on the one hand and the third input on the other hand.

Electrode 11a is raised and lowered by a hydraulic pressure system shown schematically in the drawing. A cantilever clamp 60 holds electrode 11a over furnace 10 and the clamp is raised and lowered by a piston 60a moving in a hydraulic cylinder 61 which is fed through an input conduit 62 from a reservoir 63. A recirculation conduit 64 leading from reservoir 63 is connected in series through a pump 65 driven by an alternating current motor 66, through a pump 67 driven by direct current motor 46, and back into the reservoir. An output conduit 68 leads from cylinder 61 to join recirculation conduit 64 between pumps 65 and 67.

In the operation of the described embodiment the voltages appearing on lines 17a and 17b and transformed at their respective transformers 19 and rectified by diodes 21 are combined by adder 22 and the resultant voltage signal is amplified by amplifier 24 and passed to adder 25. It will be appreciated that voltage signals of different polarities could be taken by adder 22 and subtracted from one the other. Normally there is no voltage signal fed into adder 25 from line 26, the rectified voltage signal through rheostat 29a being used only for manual operation when switch 28 has been closed; consequently the output signal from adder 25 is equal to its input signal when the automatic control device is in operation. The output signal from adder 25 is passed to adder 26 where a bias voltage signal from line 26 through variable rheostat 31 is added to it. A feedback signal through line 50 is subtracted from the sum of the input signals from adder 25 and line 28 in adder 30 and the resultant signal is amplified by amplifier 33. Line 50 provides a negative feedback signal proportional to the voltage of motor 46 and acts to limit the rate of change in the speed of that motor. The output from amplifier 33 is subtractively combined in adder 34 with a feedback signal through line 47 from resistor 45, which provides a negative feedback signal, preset by the adjustable resistor, to limit the maximum current supplied to motor 46. The resultant signal from adder 34 is amplified by amplifier 35 and the amplified output is applied to the input terminal of firing control circuit 36 which provides three-phased trigger signals, one trigger signal being applied to each silicon controlled rectifier 38 between its gate and its cathode. Silicon-controlled rectifiers 38, which are connected to direct current motor 46, control the power supplied to motor 46, as determined by the length of time the rectifier is allowed to conduct during any one-half cycle of the alternating current power source. The firing of each silicon control rectifier 38 is retarded in proportion to the magnitude of the signal received by firing control circuit 36 which is in turn proportional to the voltage drop across bus bar 16.

Pump 65, in the hydraulic circuit which moves electrode 11a, provides a pressure head in cylinder 61 which maintains the electrode in a steady position midway between its limits of upward and downward travel, and this head is maintained at the synchronous speed of alternating current motor 66. Bleed pump 67 is operated in series with pump 65 at a rate to maintain the constant head in cylinder 61 when direct current motor 46 is operating at one-half speed.

As long as the arc from electrode 11a is constant and the line voltage feeding that electrode is constant the voltage drop across bus bar 16 will not vary and consequently the output of direct current motor 46 will be constant, governed by the signal fed from adder 22 through the system. The hydraulic system for raising and lowering electrode 11a is balanced so that a constant, predetermined signal emanating from adder 22 will control motor 46 to run at half speed and cause bleed pump 67 to maintain the same output as pump 65, allowing the pressure head in cylinder 61 to remain steady. When the arc from electrode 11a varies, the voltage drawn from transformer 15 will vary and the resultant voltage drop across bus bar 15 will increase the signal generated by adder 22. This signal, passed to firing control circuit 36, will advance the firing of silicon-controlled rectifiers 38 and increase the speed of motor 46. This will increase the output of bleed pump 67, reducing the pressure head in cylinder 61 and lowering electrode 11a, thus reducing the arc from the electrode which returns the voltage signal emanating from adder 22 back towards its original predetermined value. The feedbacks through lines 47 and 50 ensure that the speed of motor 46 does not exceed a predetermined rate of change or upper limit. Furthermore, the upper and lower limits of movement of electrode 11a are controlled by pressure release valves (not shown) connected to the hydraulic system.

A reduction in the length of arc from electrode 11a will cause the control system to operate as described above but with the opposite effect, i.e. electrode 11a is raised and the arc is lengthened, again stabilizing the voltage signal from adder 22 to produce a constant power factor.

Rheostat 29a is individually adjustable to provide a manually controlled voltage signal to adder 25 when the automatic control is not operating and no signal is being received by that adder from amplifier 24. Rheostat 31 is individually adjustable to provide a suitable bias signal to properly balance the operation of the control system.

It will be appreciated that each electrode 11, controlled independently by a separate system as described, will produce a substantially constant power factor during transient conditions, whether in respect of the physical conditions within furnace 10 or in respect of the variation in the line voltage supplying the electrodes. Ideally line 17b should be connected to the tip of electrode 11a but this is impractical and a connection of line 17b to bus bar 16 reflecting conditions at the tip of the electrode is satisfactory for the purpose. It should also be noted that the power supplies for the amplifiers in the described embodiment have been omitted for simplicity. Elements 22, 24, 25, 30, 33, 34 and 35 are shown as a single wire system although it will be understood that the signal-carrying connections shown have ground connections (not shown for simplicity).

I claim:

1. A method of regulating the arc of an electrode in an electric arc melting furnace in which the power is fed to the electrode through a bus bar, comprising the steps of:
   a. generating a first voltage signal at the input to the bus bar;
   b. generating a second voltage signal at the connection of the bus bar to the electrode;
   c. comparing the first and second voltage signals and generating a third signal varying as the difference of the compared signals; and
   d. employing the third signal to regulate the operation of means controlling the raising and lowering of the electrode to vary the electrode arc whereby the comparator signal is brought to a predetermined value.

2. A method as claimed in claim 1 in which the first and second voltage signals are rectified.

3. Apparatus for regulating the arc of an electrode in an electric arc melting furnace in which power is fed to the electrode through a bus bar, comprising;
   a. means to generate a first voltage signal at the input to the bus bar;
   b. means to generate a second voltage signal at the connection of the bus bar to the electrode;
   c. means to compare the first and second voltage signals and generate a third signal varying as the difference of the compared signals; and
   d. control means to employ the third signal to raise and lower the electrode to vary the electrode arc whereby the third signal is brought to a predetermined value.

4. Apparatus as claimed in claim 3 including means to rectify the first and second voltage signals.

5. Apparatus as claimed in claim 3 including means for providing a bias signal and means to compare the bias signal and the third signal to produce a signal varying as their sum.

6. Apparatus as claimed in claim 3 including means for disconnecting the third signal from the control means and connecting to the control means a manually controllable signal source.

7. Apparatus as claimed in claim 3 in which the control means comprises hydraulic means for raising and lowering the electrode, electric motor means fed from an alternating current power supply and designed and connected to control the hydraulic means, and silicon-controlled rectifier having its anode-cathode circuit connected in series with the power supply of the motor means, and means to delay the firing of the silicon-controlled rectifier in inverse proportion to the magnitude of the third signal.

8. Apparatus as claimed in claim 7 including means for providing a feedback signal varying as the armature voltage of the bleed motor and means to compare the third signal and the feedback signal to produce a signal varying as their difference.

9. Apparatus as claimed in claim 7 including means for providing a feedback signal proportional to the armature current of the bleed motor and means to compare the feedback signal and the third signal to produce a signal varying as their difference.

10. Apparatus as claimed in claim 7 including means for providing a bias signal, means for providing a feedback signal varying as the armature voltage of the bleed motor, and means for providing a signal varying as the difference of: the sum of the third signal and the bias signal on the one hand and the feedback signal on the other hand.

11. Apparatus as claimed in claim 7 in which the electric motor means comprises a direct current motor adapted to bleed the hydraulic means in direct proportion to the magnitude of the third signal whereby the electrode is lowered.

* * * * *